United States Patent
Xue et al.

(10) Patent No.: US 10,360,714 B1
(45) Date of Patent: Jul. 23, 2019

(54) SYSTEMS AND METHODS FOR DISPLAYING AUTONOMOUS VEHICLE ENVIRONMENTAL AWARENESS

(71) Applicant: Lyft, Inc., San Francisco, CA (US)

(72) Inventors: Han Han Xue, San Francisco, CA (US); Jisi Guo, San Francisco, CA (US); Katherine Marisa Dill, San Francisco, CA (US); Johan Ulrich Lewin Jessen, San Francisco, CA (US); Audrey Liu, Oakland, CA (US); Oleg Vadim Panichev, San Francisco, CA (US); Robert Earl Rasmusson, Jr., San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/132,327

(22) Filed: Sep. 14, 2018

(51) Int. Cl.
| | |
|---|---|
| *B60R 1/00* | (2006.01) |
| *H04N 7/18* | (2006.01) |
| *G06T 15/02* | (2011.01) |
| *G06T 11/60* | (2006.01) |
| *G06T 5/20* | (2006.01) |
| *G06T 5/00* | (2006.01) |
| *G05D 1/00* | (2006.01) |

(52) U.S. Cl.
CPC ............ *G06T 11/60* (2013.01); *G05D 1/0088* (2013.01); *G06T 5/002* (2013.01); *G06T 5/20* (2013.01); *B60R 2300/60* (2013.01)

(58) Field of Classification Search
CPC .......... B60R 2300/30; B60R 2300/301; B60R 2300/307; B60R 2300/50; B60R 2300/60; B60R 2300/80; B60R 2300/8093
USPC ........................................................ 701/301
See application file for complete search history.

(56) References Cited

U.S. PATENT DOCUMENTS

| | | | |
|---|---|---|---|
| 9,725,040 B2* | 8/2017 | Tan | ............................ B60R 1/00 |
| 10,192,121 B2* | 1/2019 | Enz | ..................... G06K 9/00771 |
| 2009/0119010 A1* | 5/2009 | Moravec | .............. G05D 1/0251 |
| | | | 701/533 |
| 2017/0148168 A1* | 5/2017 | Lindner | ................. G06T 7/0002 |
| 2018/0229657 A1* | 8/2018 | Yamamoto | ................ B60R 1/00 |

* cited by examiner

*Primary Examiner* — Adam D Tissot
(74) *Attorney, Agent, or Firm* — FisherBroyles LLP

(57) ABSTRACT

The disclosed computer-implemented method may include displaying vehicle environment awareness. In some embodiments, a visualization system may display an abstract representation of a vehicle's physical environment via a mobile device and/or a device embedded in the vehicle. For example, the visualization may use a voxel grid to represent the environment and may alter characteristics of shapes in the grid to increase their visual prominence when the sensors of the vehicle detect that an object is occupying the space represented by the shapes. In some embodiments, the visualization may gradually increase and reduce the visual prominence of shapes in the grid to create a soothing wave effect. Various other methods, systems, and computer-readable media are also disclosed.

20 Claims, 12 Drawing Sheets

SYSTEMS AND METHODS FOR DISPLAYING AUTONOMOUS VEHICLE ENVIRONMENTAL AWARENESS

BACKGROUND

A dynamic transportation network that provides on-demand transportation to transportation requestors may include vehicles operated by human drivers who participate in the dynamic transportation network as well as autonomous vehicles. Autonomous vehicles may safely and efficiently provide transportation to transportation requestors; however, the capabilities and environmental awareness of an autonomous vehicle may be opaque to a requestor that rides in the autonomous vehicle. Accordingly, a graphical interface may provide a representation of an autonomous vehicle navigating within its environment to demonstrate the environmental awareness of the autonomous vehicle to the requestor, increasing requestor confidence in the autonomous vehicle.

However, attempting to provide a high-fidelity representation of autonomous vehicle sensor data may translate poorly to human perception. In some examples, raw sensor data from an autonomous vehicle may not be formatted in a way that lends itself to producing accurate visualizations. For example, a direct translation of raw data may cause objects to appear to jitter unpredictably. In some examples, a visualization system attempting to precisely render a representation of raw sensor data may incorrectly render harmless objects as other vehicles, creating the appearance of an imminent collision. Accordingly, the instant disclosure identifies and addresses a need for additional and improved systems and methods for displaying autonomous vehicles' environmental awareness.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
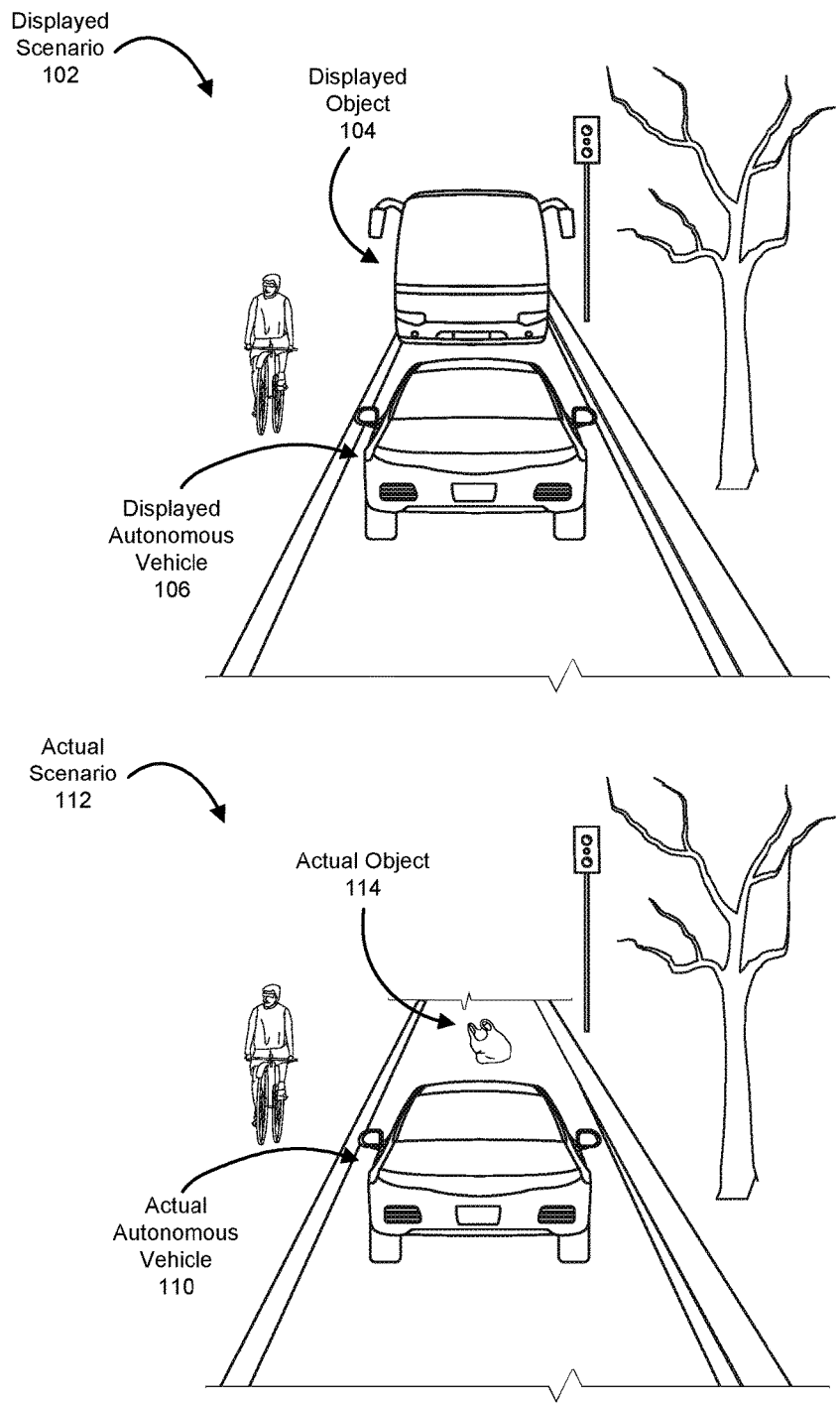
FIG. 1 illustrates an example scenario involving an autonomous vehicle and its surrounding environment as well as an example displayed representation of that scenario.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to displaying vehicle environmental awareness by providing a passenger being transported by a vehicle with a display that includes representations of the vehicle itself, the physical environment of the vehicle, and/or nearby objects detected by the vehicle's sensors. In some examples, the vehicle may be a non-autonomous vehicle that is equipped with environmental sensors to aid the driver. In other examples, the vehicle may be partially or fully autonomous and may navigate based at least in part on data from environmental sensors. In some examples, a user being transported by an autonomous vehicle may not have a high level of understanding of the vehicle's safety and/or capabilities. Displaying sensor data from the vehicle to the user may help the user to understand that the vehicle is aware of the surrounding environment and capable of safely transporting the user to their destination. However, sensor data from an autonomous vehicle may be incomplete and/or poorly formatted for generating a real-time visualization. For example, the data may not be processed, normalized, and/or sanitized in a way that is conducive to efficiently producing an accurate visualization. In some cases, an autonomous vehicle vendor may be unable or unwilling to provide a meaningful data. For example, an autonomous vehicle may provide data that is the output of one or more machine learning models and therefore is semantically useful for autonomous vehicle decision-making in a machine learning context but is less semantically useful for creating a visualization. In another example, the data may be processed in different stages and the visualization system may not receive fully processed data. In some cases, an autonomous vehicle vendor may provide a very large amount of raw data, potentially overloading the processing capacity of visualization systems that only require a subset of the raw data.

Due to one or more of the above-described difficulties with transforming environmental data used by an autonomous vehicle into data useful for visualization, visual anomalies may appear in visualization interfaces. For example, while an autonomous vehicle may correctly disregard a benign object floating past the autonomous vehicle (such as a plastic bag), a corresponding demonstration interface may incorrectly render the benign object as another vehicle apparently about to crash into the autonomous vehicle. In another example, a visualization may display another vehicle as far closer to the autonomous vehicle than the other vehicle is in reality, making a collision appear more likely. In some examples, a direct representation of raw sensor data and/or partially processed sensor data may cause surrounding environmental elements (such as other vehicles) to jitter unpredictably, potentially causing the appearance of an imminent collision. Such inaccuracies may have the opposite of the intended effect as the appearance of imminent collisions may confuse the user as to what the autonomous vehicle's sensors are currently perceiving and the connection between the perception and the behavior of the autonomous vehicle. Displaying a low-fidelity version of the vehicle's surroundings may convey enough information to the user to increase the user's understanding of the data available to the vehicle without creating the possibility for catastrophic errors in visualization that may disturb the user.

Accordingly, as may be appreciated, the systems and methods described herein may improve the functioning of a computer that facilitates transportation via autonomous vehicles. In some embodiments, the computer may be part of an autonomous vehicle. Additionally or alternatively, the computer may be a mobile device. For example, these systems and methods may improve the functioning of the computer by improving the user experience of a user who is using both the computer and an autonomous vehicle. Furthermore, for the reasons mentioned above and to be discussed in greater detail below, the systems and methods described herein may provide advantages to dynamic transportation management and/or the field of transportation by increasing user willingness to be transported by autonomous vehicles. In addition, these systems and methods may provide advantages to autonomous vehicles that operate as a part of a dynamic transportation network. For example, the autonomous vehicles may be rated as safer by users.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include road-going vehicles (e.g., cars, light trucks, etc.). Furthermore, the dynamic transportation network may include personal mobility vehicles. In some embodiments, a dynamic transportation network may include autonomous vehicles (e.g., self-driving cars) that may be capable of operating with little or no input from a human operator. In some examples, a transportation requestor may be matched with and/or transported by an autonomous vehicle with which the transportation requestor is not familiar and of which the transportation requestor may have a low level of understanding.

FIG. 1 illustrates an example scenario involving an autonomous vehicle and its surrounding environment as well as an example displayed representation of that scenario. In some examples, a display (e.g., a screen) within an autonomous vehicle may display a rendering of the environment around the autonomous vehicle. For example, a displayed scenario 102 may show a displayed autonomous vehicle 106 as well as the surroundings of displayed autonomous vehicle 106. In some examples, the autonomous vehicle may sense that an object is in front of the vehicle and a computing system may attempt to interpret the sensor data to determine the type of object. In one example, the computing system may display a displayed object 104, which may be a bus that appears to be about to crash into the autonomous vehicle. In reality, the visualization system may be inaccurately interpreting an actual scenario 112, where an actual autonomous vehicle 110 may be about to harmlessly run over an actual object 114, such as a plastic bag in the roadway. By displaying what appears to be a dangerous situation to the user, the visualization may panic the user and/or reduce the user's understanding of whether autonomous vehicle is capable of accurately perceiving its surroundings and/or behaving safely and effectively. For example, if the autonomous vehicle correctly identifies the object as harmless (despite the error in the visualization) and continues on a straight path, the user may be concerned that the autonomous vehicle continued straight into something that appeared to be an oncoming bus and as a result, the user may expect the autonomous vehicle to fail to avoid a collision with an actual bus. Additionally, a high-fidelity rendering of objects around the autonomous vehicle may be jittery (e.g., show objects moving suddenly at increments rather than smoothly) and may not accurately reflect reality or the data used by the autonomous vehicle to make decisions, worsening the user experience.

Figure 2:
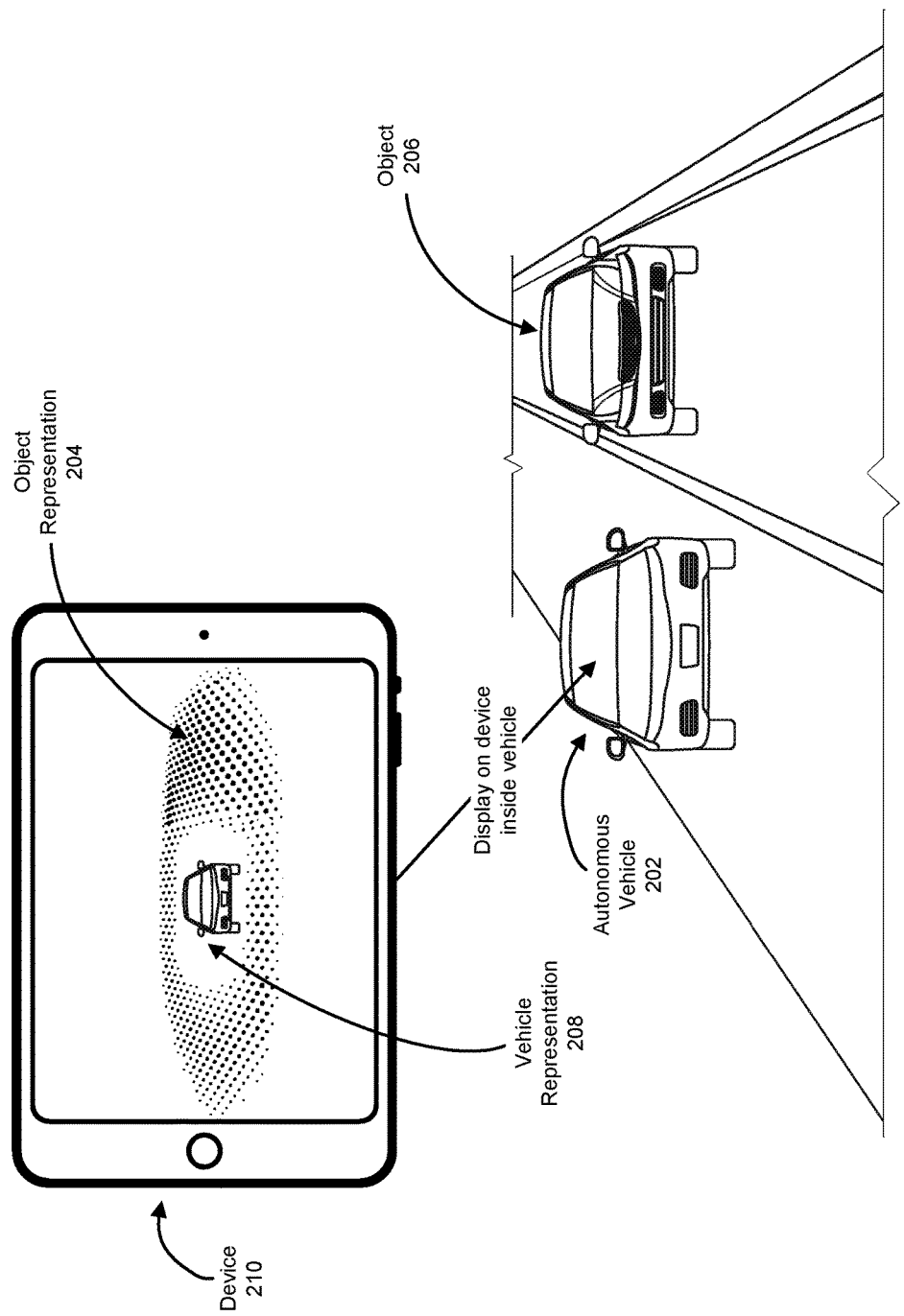
FIG. 2 is an illustration of an example representation of an autonomous vehicle in context.

FIG. 2 is an illustration of an example representation of an autonomous vehicle in context. As illustrated in FIG. 2, an autonomous vehicle 202 may encounter an object 206, such as another vehicle. In some examples, a device 210 within autonomous vehicle 202 may display a representation of the autonomous vehicle, such as vehicle representation 208, and/or an abstracted representation of the object, such as object representation 204. In some embodiments, device 210 may be a device associated with a transportation requestor being transported by autonomous vehicle 202, including but not limited to a smartphone, laptop, or tablet. Additionally or alternatively, device 210 may be a device associated with autonomous vehicle 202, such as a mobile device that is expected to remain within and/or with autonomous vehicle 202 (e.g., a tablet that is allocated to autonomous vehicle 202 by a dynamic transportation matching system that manages autonomous vehicle 202) and/or a screen that is built in to and/or otherwise affixed to autonomous vehicle 202. As will be described in later detail below, in some embodiments, the representation of the environment and/or objects displayed on device 210 may be a low-fidelity, smoothed-out, and/or otherwise abstracted version of the sensor data received from autonomous vehicle 202. By displaying a low-fidelity version of the sensor data received from autonomous vehicle 202 to a transportation requestor being transported by autonomous vehicle 202, the systems described herein may improve user understanding of the sensory data available to autonomous vehicle 202 and therefore improve user experience.

Figure 3:
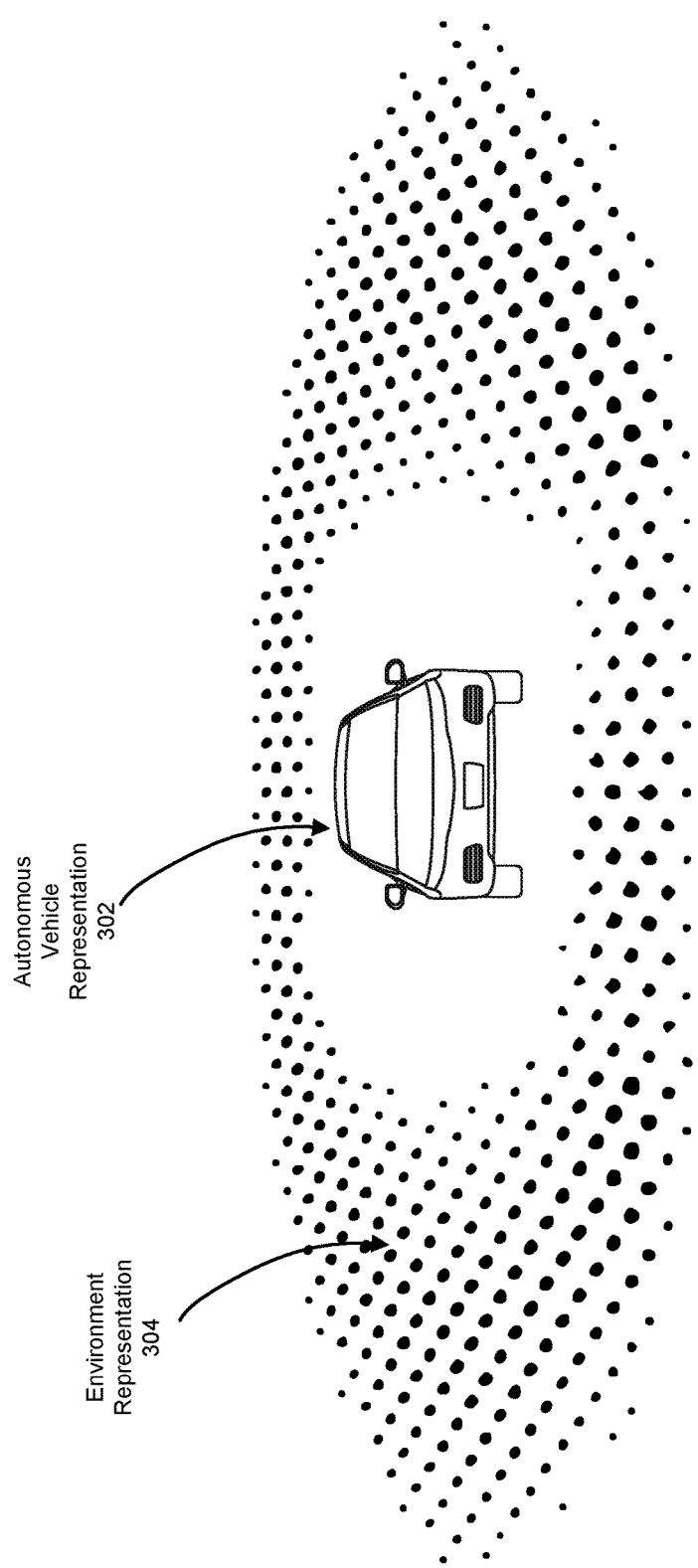
FIG. 3 is an illustration of an example representation of an autonomous vehicle and the physical environment surrounding the autonomous vehicle.

FIG. 3 is an illustration of an example representation of an autonomous vehicle and the physical environment surrounding the autonomous vehicle. As illustrated in FIG. 3, an environment representation 304 may abstractly represent the physical environment around an autonomous vehicle via a grid of shapes (e.g., a voxel grid). In some embodiments, the grid may be a two-dimensional grid. Additionally or alternatively, the grid may be a three-dimensional grid. In one embodiments, the shapes may be spheres. In some embodiments, if no nearby objects are present in the physical environment, the shapes may be of a uniform size, color, and/or relative position. In some embodiments, the shapes may have different sizes, colors, and/or physical positions to give a viewer a sense of perspective. For example, shapes farther away from the autonomous vehicle and/or the camera angle of the view may be smaller by default. In some examples, shapes on the inside of the representation of the environment (near the autonomous vehicle) and/or on the outside of the representation of the environment (far from the autonomous vehicle) may have characteristics of lower intensity (e.g., color, size, etc.) to reduce the appearance of abruptness as objects enter or exit the representation of the environment.

In some embodiments, the representation may include a representation of the autonomous vehicle, such as autonomous vehicle representation 302, to act as a visual reference point. In some examples, the representation of the autonomous vehicle may be visually static. In other examples, the representation of the autonomous vehicle may change to represent changes to the vehicle, such as active brake lights and/or turn signals.

In some embodiments, the representation of the physical environment may begin a certain distance away from the representation of the autonomous vehicle. In some examples, beginning the representation of the physical environment a predetermined radius away from the representation of the vehicle may increase user comfort and/or ability to understand the visualization by decreasing the appearance that the vehicle is surrounded by objects. Additionally or alternatively, in some embodiments, the representation of the physical environment may end a certain distance away from the representation of the autonomous vehicle. For example, the visualization may display a representation of the physical environment in a torus that begins at a one-foot radius outside the autonomous vehicle and ends at a twenty-foot radius outside the autonomous vehicle. In some embodiments, the representation of the physical environment may only display objects at certain heights. For example, the representation of the of the physical environment may include objects that occupy space at or below the height of the autonomous vehicle, the height of a standard eighteen-wheeler truck, and/or the height of a standard traffic light. In one example, the representation of the physical environment may not display a representation of a bridge that the autonomous vehicle is passing underneath despite the bridge being within the horizontal radius of the physical environment represented in the visualization. By omitting representations of objects that only occupy space above a certain height, the visualization may avoid giving viewers the impression that the autonomous vehicle is about to crash into an object that the autonomous vehicle will in fact pass safely below.

Figure 4:
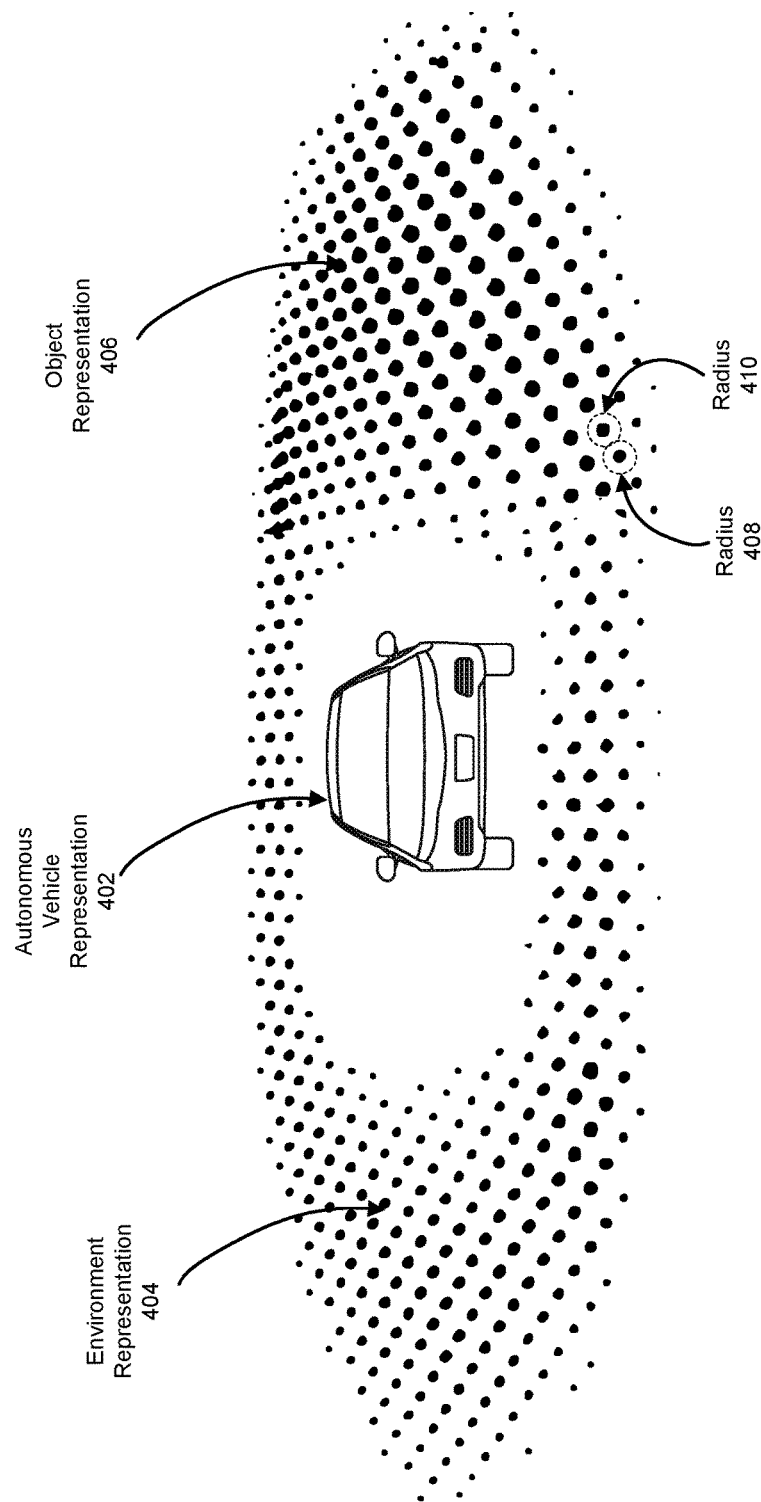
FIG. 4 is an illustration of an example representation of an autonomous vehicle and the physical environment surrounding the autonomous vehicle.

FIG. 4 is an illustration of an example representation of an autonomous vehicle and the physical environment surrounding the autonomous vehicle. In some examples, the systems described herein may display, within environment representation 404 around autonomous vehicle representation 402, an object representation 406 of an object detected by the autonomous vehicle's sensors. In some examples, the systems described herein may display object representation 406 in relation to autonomous vehicle representation 402 based on the position of the actual object in relation to the actual vehicle.

In some embodiments, the systems described herein may display object representation 406 by altering the size, color, and/or position of shapes in the grid that represents the physical environment. For example, the systems described herein may increase the size of a shape to represent that an object occupies the position represented by the shape. Additionally or alternatively, the systems described herein may alter the position of the shape (e.g., by moving the shape vertically above a horizontal grid) and/or the color of the shape (e.g., by shading a shape from purple to pink). In some embodiments, the systems described herein may incrementally alter a shape while the object occupies the space represented by the shape. For example, if the object is within the space represented by the shape for half a second, the systems described herein may increase the size of the shape by ten percent. If the object remains within the space represented by the shape for an additional half second, the systems described herein may increase the size of the shape by an additional ten percent. Similarly, the systems described herein may gradually change the color and/or position of the shape as the object continues to occupy the space represented by the shape. In some embodiments, the systems described herein may continue incrementally modifying the shape until a predetermined threshold is reached, such as 200% of the original size of the shape, a set height above the grid, and/or a specific color. In some examples, the systems described herein may incrementally return the shape to its original settings after the object leaves the shape represented by the shape. In some embodiments, the space represented by each shape may include a predetermined radius around the shape, such as radius 408 and/or radius 410. In one example, each sphere within a grid may represent a space of a radius that equals half the distance between itself and the adjacent spheres. In another example, shapes may represent overlapping spaces.

Figure 5A:
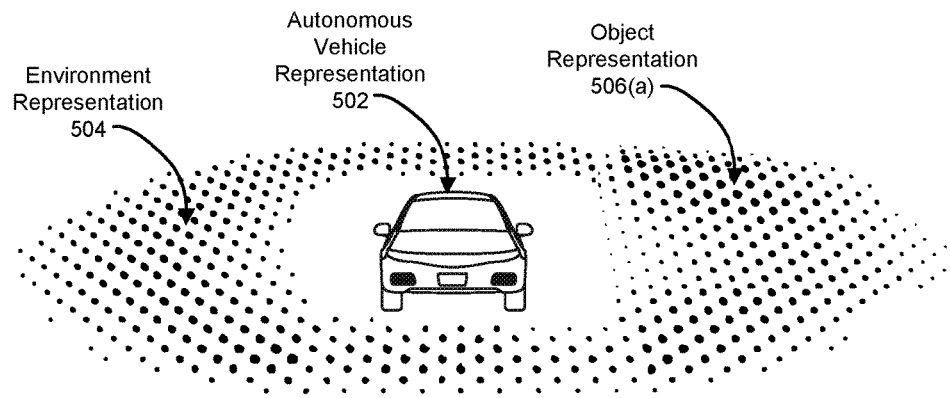
FIGS. 5A, 5B, and 5C are illustrations of an example representation of an autonomous vehicle and the physical environment surrounding the autonomous vehicle.
Figure 5B:
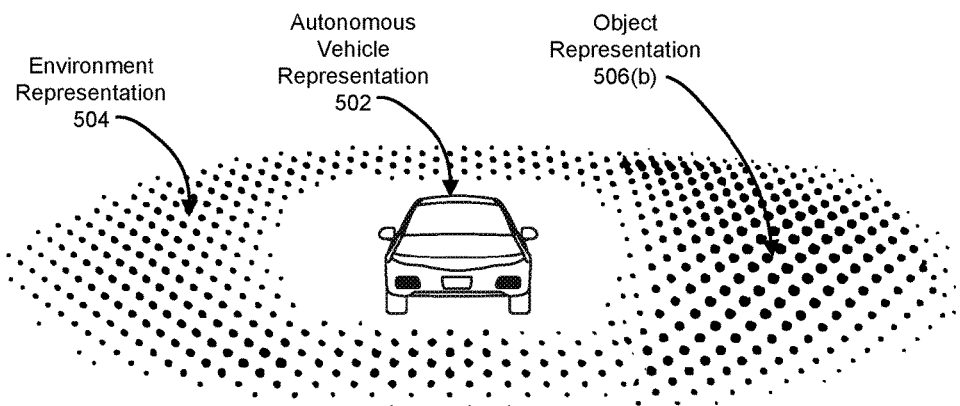
Figure 5C:
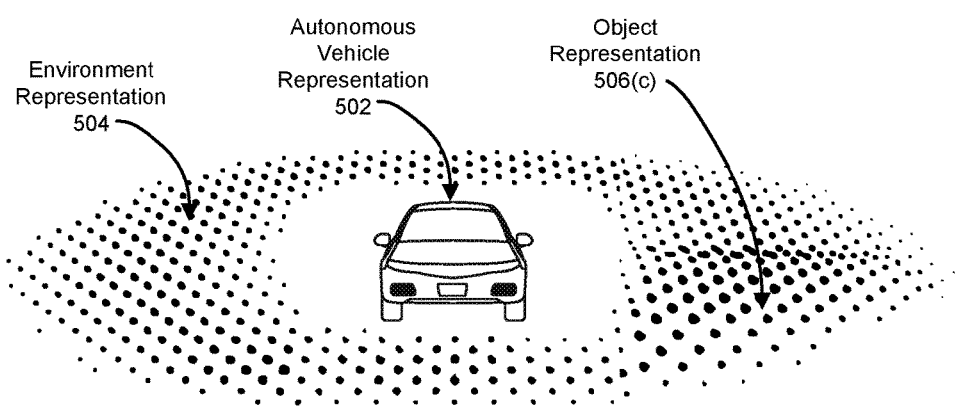

FIGS. 5A, 5B, and 5C are illustrations of an example representation of an autonomous vehicle and the physical environment surrounding the autonomous vehicle as an object moves through the space around the vehicle. In one example, the systems described herein may display an environment representation 504 around an autonomous vehicle representation 502. In one example, as an object enters the space around the vehicle, the systems described herein may display an object representation 506(a) by altering characteristics of shapes at the edge of a grid that makes up environment representation 504. As the object draws alongside the vehicle, the systems described herein may display an object representation 506(b) by returning the shapes at the edge of the grid to their original characteristics while altering the shapes that represent the space currently occupied by the object. As the object moves away from the vehicle, the systems described herein may display an object representation 506(c). In some examples, by gradually altering the size, color, and/or position of spheres in a grid as the object moves, the systems described herein may create a smoothing and/or wave-like effect that smoothly displays the movement of the object (and/or the movement of the vehicle relative to the object) without the jitteriness that is sometimes the byproduct of reproducing visualizations directly from sensor data.

Figure 6:
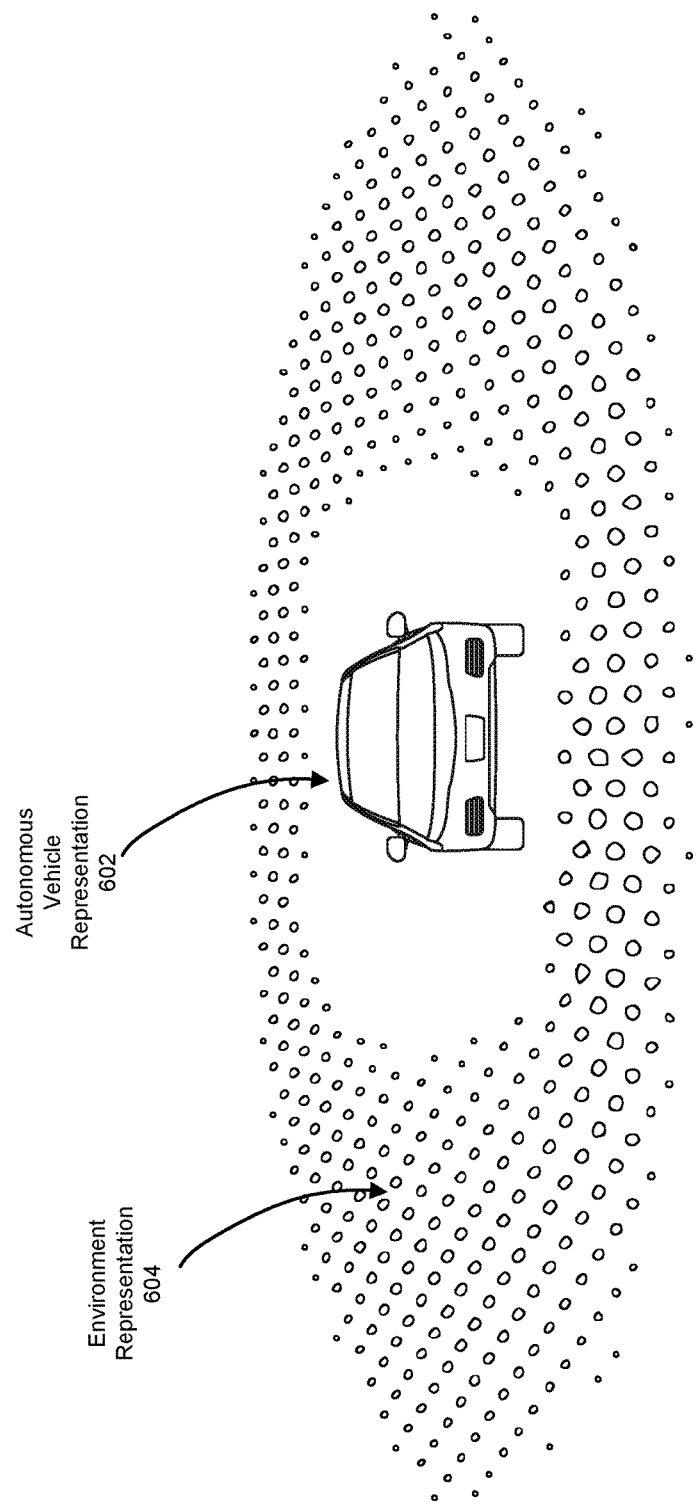
FIG. 6 is an illustration of an example representation of an autonomous vehicle and the physical environment surrounding the autonomous vehicle.

FIG. 6 is an illustration of an example representation of an autonomous vehicle and the physical environment surrounding the autonomous vehicle. In some embodiments, if an interruption in sensor data received from the autonomous vehicle occurs, the systems described herein may update the visualization to reflect the interruption. For example, as illustrated in FIG. 6, the systems described herein may continue to display autonomous vehicle representation 602 as normal but may alter environment representation 604. In one example, the systems described herein may change the color of the shapes that make up environment representation 604, for example, by turning all of the shapes grey. In another example, the systems described herein may alter the size of the shapes, for example, by shrinking the shapes. In another example, the systems described herein may entirely remove the representation of the physical environment from the visualization. In some embodiments, the systems described herein may notify the user via a textual message, within the visualization and/or out-of-band, that states that there has been a temporary interruption in sensor data to the visualization.

In some embodiments, the systems described herein may change the visualization to reflect that a human operator has taken control of the autonomous vehicle. In some examples, the systems described herein may alter and/or stop displaying the representation of the physical environment. Additionally or alternatively, the systems described herein may stop displaying one or more representations of the predicted behavior of the autonomous vehicle. For example, the systems described herein may calculate a predicted path of the autonomous vehicle based on data received from the autonomous vehicle (e.g., acceleration, deceleration, steering, and/or navigation system data) and may display the predicted path in the visualization. In some embodiments, when a human operator takes control of the autonomous vehicle, the systems described herein may cease displaying the predicted path of the vehicle.

Figure 7:
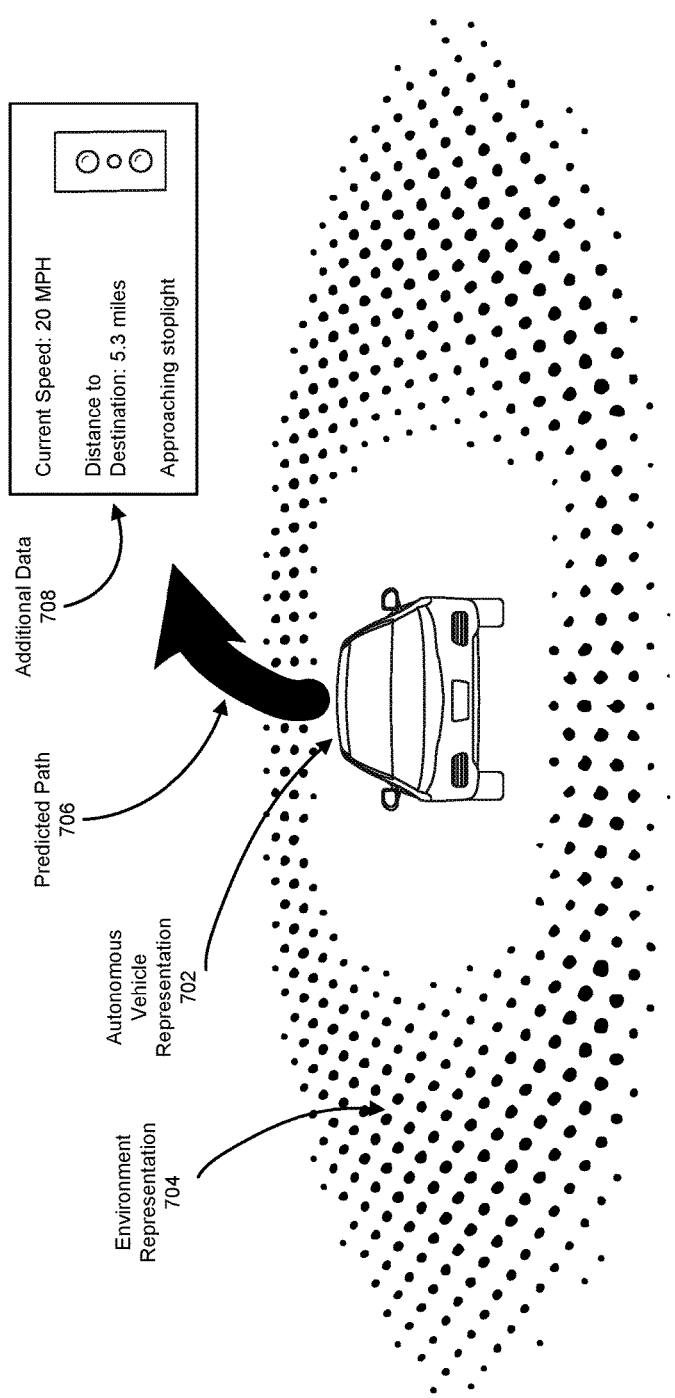
FIG. 7 is an illustration of an example representation of an autonomous vehicle and the physical environment surrounding the autonomous vehicle.

FIG. 7 is an illustration of an example representation of an autonomous vehicle, the physical environment surrounding the autonomous vehicle, and additional data. In some embodiments, the systems described herein may display additional data 708 alongside autonomous vehicle representation 702 and/or environmental representation 704. In some embodiments, the systems described herein may display additional data within a visualization including but not limited to the current speed of the vehicle, the current fuel economy of the vehicle, the distance traveled this trip, the remaining distance this trip, and/or the distance to and/or from a transfer point. In some examples, the systems described herein may display icons and/or text representing traffic control devices encountered by the autonomous vehicle such as traffic lights, stop signs, yield signs, and/or other street signs. In one embodiment, the systems described herein may calculate a predicted path of the autonomous vehicle based on data received from the autonomous vehicle and may display predicted path 706 as part of the visualization. In one embodiment, the display of predicted path 706 may vary based on the confidence in the accuracy of predicted path 706 based on data received from the autonomous vehicle. In some embodiments, predicted path 706 may be opaque when the autonomous vehicle is moving and transparent when the autonomous vehicle is not moving and/or may change in opacity based on the speed of the autonomous vehicle. In some examples, if the autonomous vehicle is expected to change direction drastically and/or is currently changing direction drastically, predicted path 706 may be shown with dotted rather than solid lines. In some embodiments, the systems described herein may generate predicted path 706 based on data gathered from an autonomous path planner that plots the trajectory of the vehicle in a future time period and/or a route indicator that has access to information about the destination of the vehicle.

Figure 8:
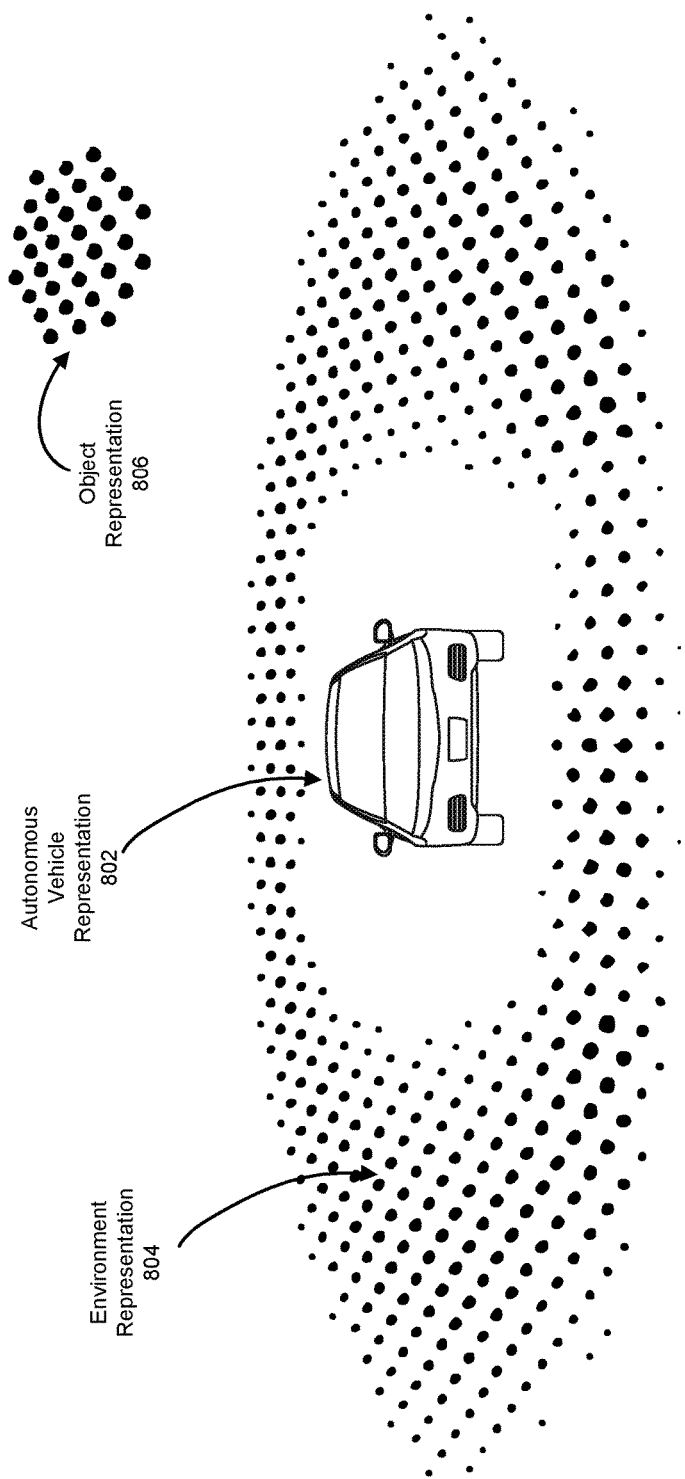
FIG. 8 is an illustration of an example representation of an autonomous vehicle and the physical environment surrounding the autonomous vehicle.

FIG. 8 is an illustration of an example representation of an autonomous vehicle and the physical environment surrounding the autonomous vehicle. In some embodiments, the systems described herein may show representations of objects in the visualization even if those objects are outside of the representation of the environment. For example, the systems described herein may display object representation 806 despite object representation 806 representing an object occupying space outside of the space represented by environment representation 804 around autonomous vehicle representation 802. In some embodiments, the systems described herein may only display objects outside of the representation of the environment under special circumstances, such as if the object is above and/or below a certain size, moving at a certain speed, and/or otherwise indicated to be an object of interest (e.g., by the sensors of the autonomous vehicle). In other embodiments, the systems described herein may display any object detected by the autonomous vehicle's sensors whether or not the object is within the radius covered by the representation of the physical environment.

In some embodiments, the systems described herein may provide a transportation requestor being transported by an autonomous vehicle with information about the autonomous vehicle and/or the surrounding environment of the autonomous vehicle via means other than a display. For example, the systems described herein may provide haptic feedback (e.g., vibration) to indicate the presence and/or location of nearby objects in the physical environment. Additionally or alternatively, the systems described herein may provide audio information about nearby objects. For example, the systems described herein may play a tone to indicate that an object has been detected by the sensors of the autonomous vehicle. In one embodiment, the systems described herein may play a tone from a speaker that corresponds to a position of the object (e.g., from a rear speaker if the object is behind the vehicle).

Figure 9:
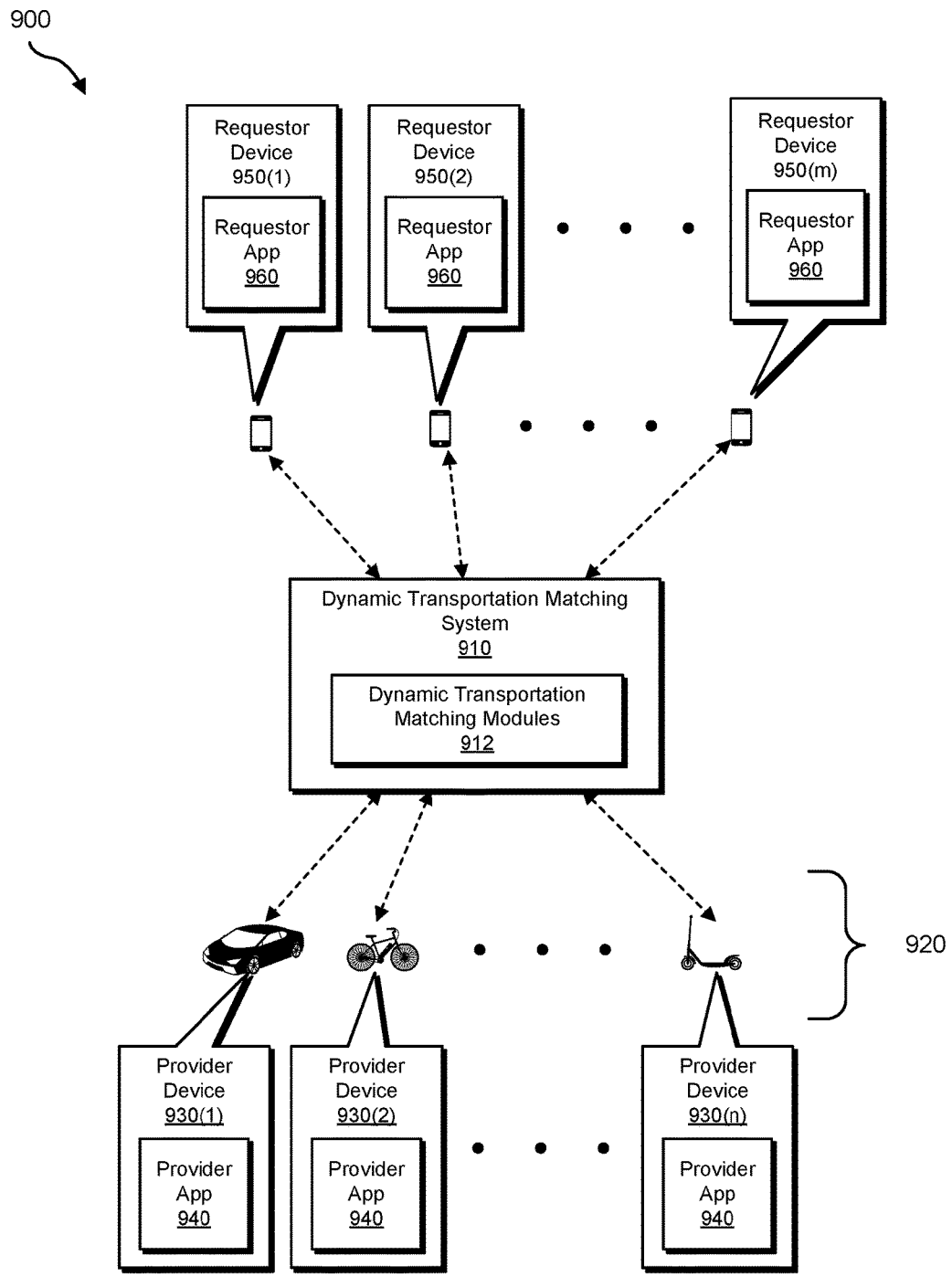
FIG. 9 is a block diagram of an example system for displaying autonomous vehicle environmental awareness.

FIG. 9 illustrates an example system 900 for matching transportation requests with a dynamic transportation network that includes personal mobility vehicles. As shown in FIG. 9, a dynamic transportation matching system 910 may be configured with one or more dynamic transportation matching modules 912 that may perform one or more of the steps described herein. Dynamic transportation matching system 910 may represent any computing system and/or set of computing systems capable of matching transportation requests. Dynamic transportation matching system 910 may be in communication with computing devices in each of a group of vehicles 920. Vehicles 920 may represent any vehicles that may fulfill transportation requests. In some examples, vehicles 920 may include disparate vehicle types and/or models. For example, vehicles 920 may include road-going vehicles and personal mobility vehicles. In some examples, some of vehicles 920 may be standard commercially available vehicles. According to some examples, some of vehicles 920 may be owned by separate individuals (e.g., transportation providers). Furthermore, while, in some examples, many or all of vehicles 920 may be human-operated, in some examples many of vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 2 does not specify the number of vehicles 920, it may be readily appreciated that the systems described herein are applicable to hundreds of vehicles, thousands of vehicles, or more. In one example, dynamic transportation matching system 910 may coordinate transportation matchings within a single region for 50,000 vehicles or more on a given day. In some examples, vehicles 920 may collectively form a dynamic transportation network that may provide transportation supply on an on-demand basis to transportation requestors.

As mentioned above, dynamic transportation matching system 910 may communicate with computing devices in each of vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 910.

As shown in FIG. 9, vehicles 920 may include provider devices 930(1)-(*n*) (e.g., whether integrated into the vehicle, permanently affixed to the vehicle, temporarily affixed to the vehicle, worn by a driver of the vehicle, etc.). In some examples, provider devices 930 may include a provider app 940. Provider app 940 may represent any application, program, and/or module that may provide one or more services related to operating a vehicle and/or providing transportation matching services. For example, provider app 940 may include a transportation matching application for providers. In some examples, provider application 940 may match the user of provider app 940 (e.g., a transportation provider) with transportation requestors through communication with dynamic transportation matching system 910. In addition, and as is described in greater detail below, provider app 940 may provide dynamic transportation management system 910 with information about a provider (including, e.g., the current location of the provider) to enable dynamic transportation management system 910 to provide dynamic transportation matching and/or management services for the provider and one or more requestors. In some examples, provider app 940 may coordinate communications and/or a payment between a requestor and a provider. According to some embodiments, provider app 940 may provide a map service, a navigation service, a traffic notification service, and/or a geolocation service.

Additionally, as shown in FIG. 9, dynamic transportation matching system 910 may communicate with requestor devices 950(1)-(*m*). In some examples, requestor devices 950 may include a requestor app 960. Requestor app 960 may represent any application, program, and/or module that may provide one or more services related to requesting transportation matching services. For example, requestor app 960 may include a transportation matching application for requestors. In some examples, requestor app 960 may match the user of requestor app 960 (e.g., a transportation requestor) with transportation providers through communication with dynamic transportation matching system 910. In addition, and as is described in greater detail below, requestor app 960 may provide dynamic transportation management system 910 with information about a requestor (including, e.g., the current location of the requestor) to enable dynamic transportation management system 910 to provide dynamic transportation matching services for the requestor and one or more providers. In some examples, requestor app 960 may coordinate communications and/or a payment between a requestor and a provider. According to some embodiments, requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 10:
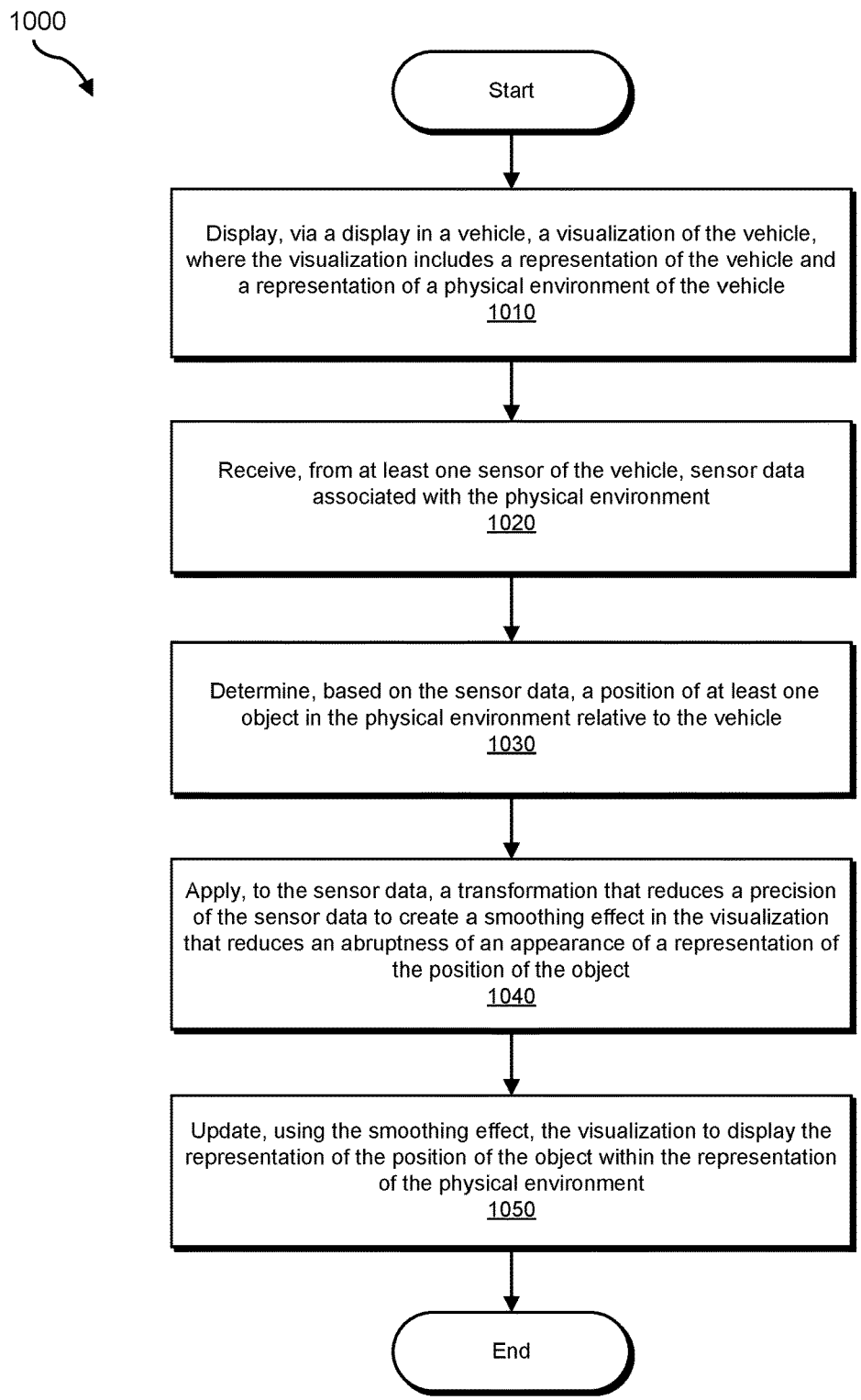
FIG. 10 is a flow diagram of an example method for displaying autonomous vehicle environmental awareness.

FIG. 10 illustrates an example method 1000 for determining allocation of personal mobility vehicles. As illustrated in FIG. 10, at step 1010, one or more of the systems described herein may display, via a display in a vehicle, a visualization of the vehicle, where the visualization may include a representation of the vehicle and a representation of a physical environment of the vehicle.

In some examples, the systems described herein may display the representation of the physical environment of the vehicle by displaying the representation of the physical environment within a limited radius around the vehicle. Additionally or alternatively, the systems described herein may display the representation of the physical environment of the vehicle by displaying the representation of the physical environment starting beyond a predetermined radius around the vehicle. In one embodiment, the systems described herein may determine, based on the sensor data, a position of an object outside the limited radius around the vehicle and may display a representation of the object within the visualization outside the representation of the physical environment In one embodiment, the systems described herein may display the visualization by sending the visualization to a mobile computing device associated with a passenger being transported within the vehicle. Additionally or alternatively, the systems described herein may display the visualization by sending the visualization to a display device associated with the vehicle.

In one embodiment, the vehicle may be an autonomous vehicle. In some embodiments, displaying the visualization may include predicting, based on data received from at least one system of the vehicle autonomous, a projected direction of travel of the autonomous vehicle and displaying a representation of the projected direction of travel within the visualization.

At step 1020, one or more of the systems described herein may receive, from at least one sensor of the vehicle, sensor data associated with the physical environment.

In one embodiment, the systems described herein may receive the sensor data associated with the physical environment by receiving incomplete sensor data from a third-party source that does not include complete sensor data perceived by sensors of the vehicle. Additionally or alternatively, the systems described herein may receive the sensor data associated with the physical environment by receiving sensor data from a third-party source that is not formatted for producing the visualization and may extract, from the sensor data from the third-party source that is not formatted for producing the visualization, relevant data to produce the visualization. In one example, receiving the sensor data associated with the physical environment may include receiving an object bounding box associated with the object.

At step 1030, one or more of the systems described herein may determine, based on the sensor data received from the vehicle, a position of at least one object in the physical environment relative to the vehicle.

At step 1040, one or more of the systems described herein may apply, to the sensor data received from the vehicle, a transformation that reduces a precision of the sensor data to create a smoothing effect in the visualization that reduces an abruptness of an appearance of a representation of the position of the object.

At step 1050, one or more of the systems described herein may update, using the smoothing effect, the visualization to display a representation of the position of the object within the representation of the physical environment.

In one embodiment, the visualization may include a grid of shapes that represent the physical environment, applying the transformation that reduces the precision of the sensor data to create the smoothing effect in the visualization may include mapping the position of the object to at least one shape in the grid of shapes, and updating the visualization to display the representation of the position of the object may include modifying at least one attribute of at least one shape in the grid of shapes that represents the position of the object. In some examples, the systems described herein may modify the attribute of the shape by incrementally modifying the attribute of the shape based at least in part on a length of time that the object occupies the position relative to the vehicle.

In one embodiment, the systems described herein may apply, to the sensor data received from the vehicle, the transformation that reduces the precision of the sensor data to create the smoothing effect in the visualization by specifying the grid of shape to represent a low-fidelity model of the physical environment that does not capture a high level of precision. In some examples, the systems described herein may modify the attribute of the at least one shape in the grid of shapes that represents the position of the object by modifying the color of the shape. In some examples, the systems described herein may modify the attribute of the at least one shape in the grid of shapes that represents the position of the object by modifying the size of the shape. Additionally or alternatively, the systems described herein may modify the attribute of the at least one shape in the grid of shapes that represents the position of the object by modifying the position of the shape.

In one embodiment, the systems described herein may detect that a human driver has assumed control of the autonomous vehicle and may update the visualization to reflect that the human driver has assumed control of the autonomous vehicle. In some examples, the systems described herein may update the visualization to reflect that the human driver has assumed control of the autonomous vehicle by ceasing to display at least one element within the visualization that represents a prediction of a behavior of the autonomous vehicle based on the sensor data.

Figure 11:
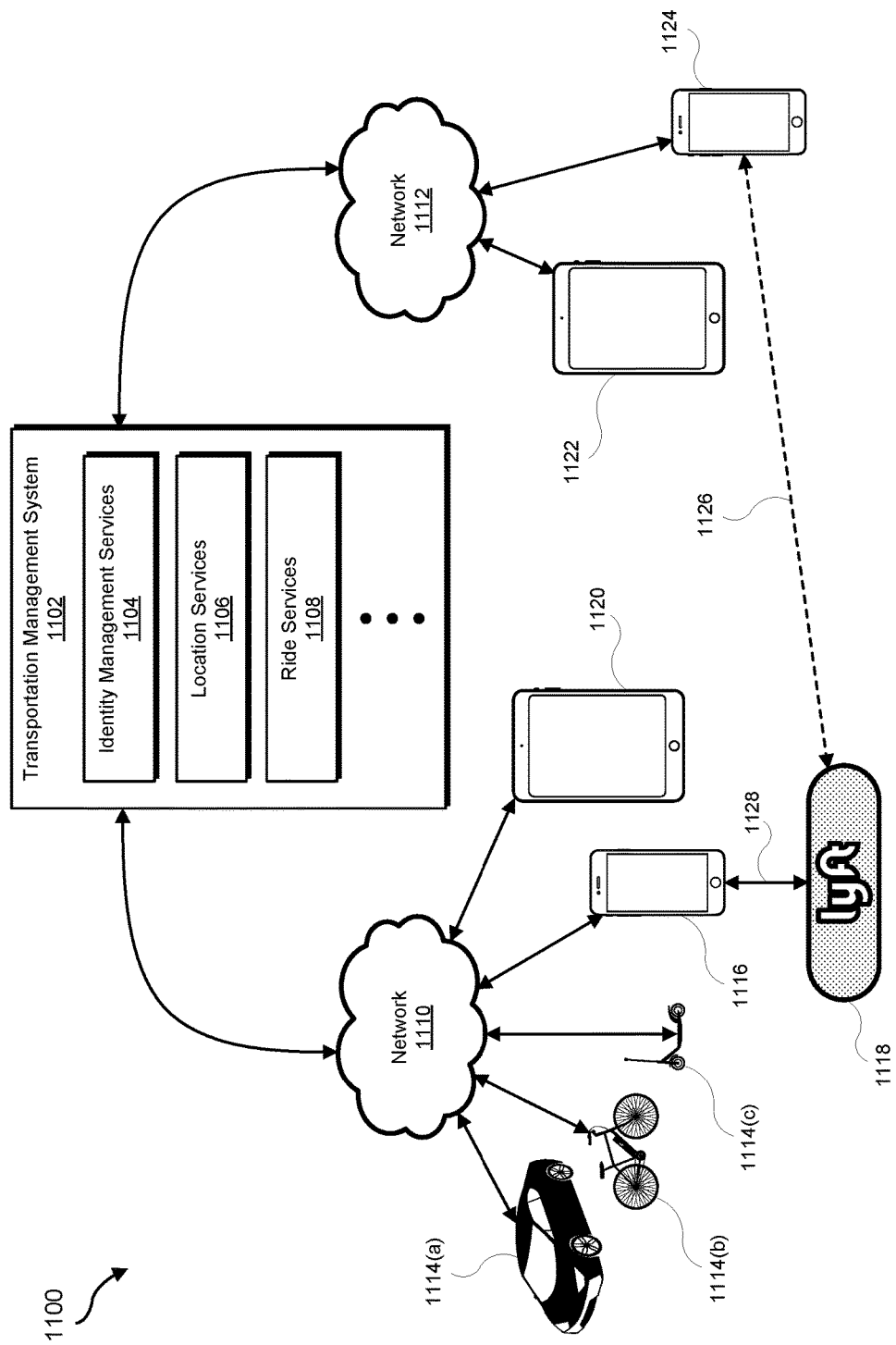
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(*a*), 1114(*b*), and/or 1114(*c*); provider computing devices 1116 and tablets 1120; and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services module 1104 has authenticated the identity a ride requestor, ride services module 1108 may attempt to match the requestor with one or more ride providers. In some embodiments, ride services module 1108 may identify an appropriate provider using location data obtained from location services module 1106. Ride services module 1108 may use the location data to identify providers who are geographically close to the requestor (e.g., within a certain threshold distance or travel time) and/or who are otherwise a good match with the requestor. Ride services module 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.11 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 902.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
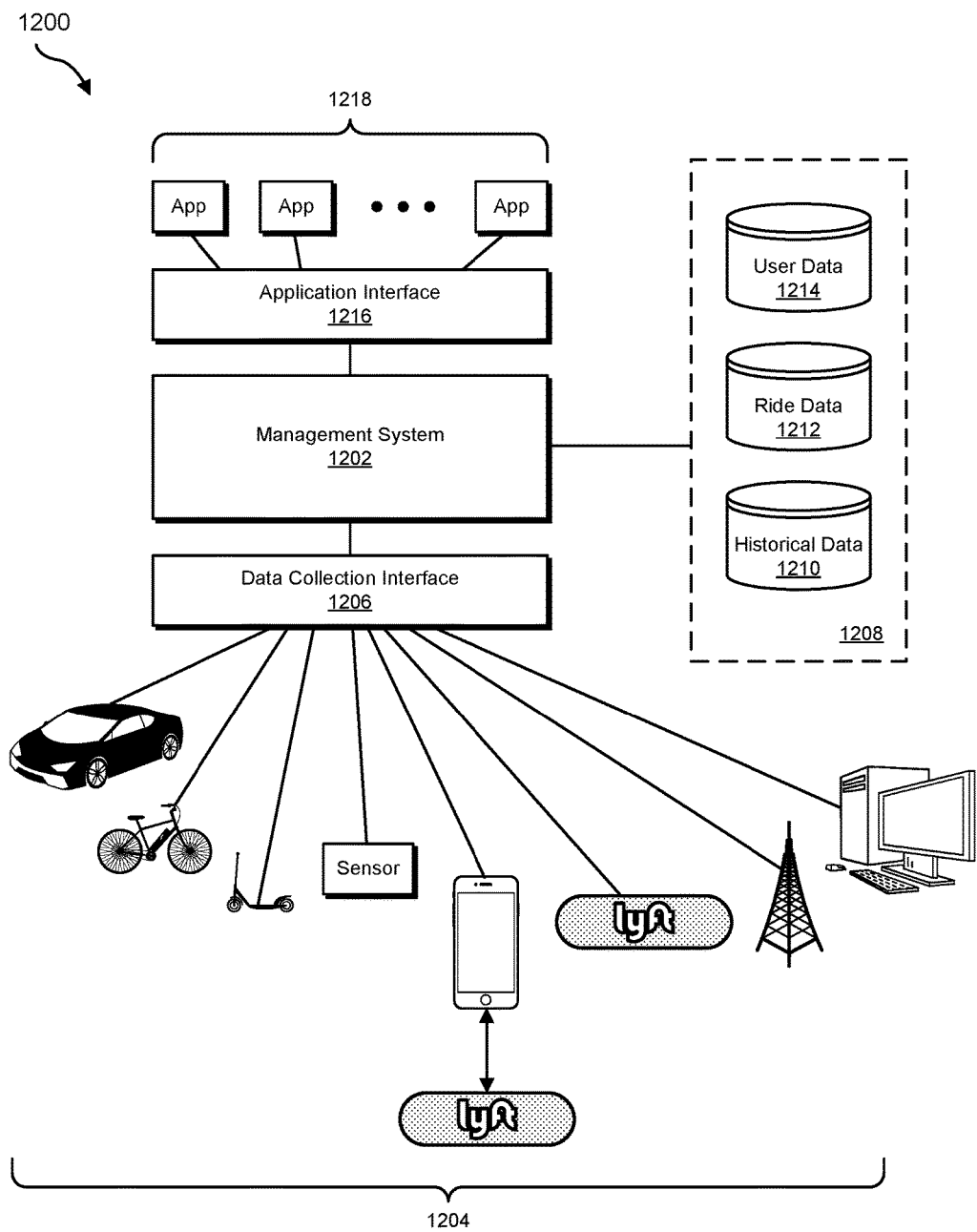
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 may include one or more data stores, such as databases, object storage systems and services, cloud-based storage services, and other data stores. For example, various data stores may be implemented on a non-transitory storage medium accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   providing a visualization comprising a representation of a vehicle and a representation of a physical environment associated with the vehicle, the visualization including an array of graphical elements each having an attribute indicating an unoccupied state;
   receiving, from at least one sensor of the vehicle, sensor data associated with the physical environment;
   determining, based on the sensor data, a position of at least one object in the physical environment relative to the vehicle; and
   altering the attribute for each of one or more graphical elements included in the array of graphical elements, each of the one or more graphical elements corresponding to the position of the at least one object.

2. The computer-implemented method of claim 1, wherein altering the attribute for each of the one or more graphical elements comprises incrementally modifying the attribute of the respective graphical element based at least in part on a length of time that the object occupies the position relative to the vehicle.

3. The computer-implemented method of claim 1, wherein altering the attribute for each of the one or more graphical elements comprises modifying a color of the respective graphical element.

4. The computer-implemented method of claim 1, wherein altering the attribute for each of the one or more graphical elements comprises modifying a size of the respective graphical element.

5. The computer-implemented method of claim 1, wherein altering the attribute for each of the one or more graphical elements comprises modifying a position of the respective graphical element.

6. The computer-implemented method of claim 1, wherein the vehicle comprises an autonomous vehicle.

7. The computer-implemented method of claim 6, wherein providing the visualization comprises predicting, based on data received from at least one system of the autonomous vehicle, a projected direction of travel of the autonomous vehicle, wherein the visualization further comprises a representation of the projected direction of travel of the autonomous vehicle.

8. The computer-implemented method of claim 1, wherein receiving the sensor data associated with the physical environment comprises receiving incomplete sensor data from a third-party source that does not comprise complete sensor data perceived by sensors of the vehicle.

9. The computer-implemented method of claim 1,
   wherein receiving the sensor data associated with the physical environment comprises receiving sensor data from a third-party source that is not formatted in a way that is conducive for generating the visualization; and
   wherein the method further comprises extracting, from the sensor data from the third-party source, relevant data to generate the visualization.

10. The computer-implemented method of claim 1, wherein the representation of the physical environment associated with the vehicle comprises a representation of the physical environment associated with the vehicle that is within a limited radius around the vehicle.

11. The computer-implemented method of claim 10, further comprising:
    determining, based on the sensor data, a position of an object outside the limited radius around the vehicle; and
    altering the attribute for each of an additional one or more graphical elements included in the array of graphical elements, the altered additional one or more graphical elements providing a representation of the object within the visualization that is outside of the representation of the physical environment.

12. The computer-implemented method of claim 1, wherein the representation of the physical environment associated with the vehicle comprises a representation of the physical environment starting beyond a predetermined radius around the vehicle.

13. The computer-implemented method of claim 1, wherein providing the visualization comprises sending the visualization to a mobile computing device associated with a passenger within the vehicle.

14. The computer-implemented method of claim 1, wherein providing the visualization comprises:
   sending the visualization to the vehicle; and
   displaying the visualization on a display device associated with the vehicle.

15. A system comprising:
   a display module, stored in memory, that provides a visualization comprising a representation of a vehicle and a representation of a physical environment associated with the vehicle, the visualization including an array of graphical elements each having an attribute indicating an unoccupied state;
   a receiving module, stored in memory, that receives, from at least one sensor of the vehicle, sensor data associated with the physical environment;
   a determination module, stored in memory, that determines, based on the sensor data, a position of at least one object in the physical environment relative to the vehicle;
   a transformation module, stored in memory, that alters the attribute for each of one or more graphical elements included in the array of graphical elements, each of the one or more graphical elements corresponding to the position of the at least one object; and
   at least one physical processor that executes the display module, the receiving module, the determination module, and the transformation module.

16. The system of claim 15, wherein the transformation module alters the attribute for each of the one or more graphical elements by incrementally modifying the attribute of the respective graphical element based at least in part on a length of time that the object occupies the position relative to the vehicle.

17. A computer-readable medium comprising computer-readable instructions that, when executed by at least one processor of a computing device, cause the computing device to:
   provide a visualization comprising a representation of a vehicle and a representation of a physical environment associated with the vehicle, the visualization including an array of graphical elements each having an attribute indicating an unoccupied state;
   receive, from at least one sensor of the vehicle, sensor data associated with the physical environment;
   determine, based on the sensor data, a position of at least one object in the physical environment relative to the vehicle; and
   alter the attribute for each of one or more graphical elements included in the array of graphical elements, each of the one or more graphical elements corresponding to the position of the at least one object.

18. The computer-implemented method of claim 1, wherein
   the one or more graphical elements provide a representation of a low-fidelity version of the sensor data.

19. The computer-implemented method of claim 1,
   wherein the attribute for each graphical element included in the array of graphical elements is a size attribute; and
   wherein indicating an unoccupied state comprises each graphical element included in the array of graphical elements having a uniform size as provided by the size attribute.

20. The computer-implemented method of claim 1, wherein the array of graphical elements is a grid of shapes.

* * * * *